(12) United States Patent
Saito et al.

(10) Patent No.: US 8,541,783 B2
(45) Date of Patent: Sep. 24, 2013

(54) ELECTRIC DOUBLE-LAYER CAPACITOR AND SOLAR POWER GENERATION DEVICE

(75) Inventors: Yumiko Saito, Kanagawa (JP); Junpei Momo, Kanagawa (JP); Rie Matsubara, Kanagawa (JP); Kuniharu Nomoto, Kanagawa (JP); Hiroatsu Todoriki, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 73 days.

(21) Appl. No.: 13/196,345

(22) Filed: Aug. 2, 2011

(65) Prior Publication Data

US 2012/0032170 A1    Feb. 9, 2012

(30) Foreign Application Priority Data

Aug. 4, 2010 (JP) ................. 2010-174995

(51) Int. Cl.
*H01L 29/10* (2006.01)
(52) U.S. Cl.
USPC ............................. 257/53; 361/502
(58) Field of Classification Search
USPC ............................. 257/53; 361/502
See application file for complete search history.

(56) References Cited

U.S. PATENT DOCUMENTS

| | | | |
|---|---|---|---|
| 5,419,977 A * | 5/1995 | Weiss et al. | 429/7 |
| 2006/0219289 A1 * | 10/2006 | Skryabin et al. | 136/244 |
| 2006/0268493 A1 * | 11/2006 | Miyasaka et al. | 361/502 |
| 2010/0307558 A1 | 12/2010 | Yamazaki et al. | |
| 2010/0307559 A1 | 12/2010 | Yamazaki et al. | |
| 2011/0073561 A1 | 3/2011 | Yamazaki et al. | |
| 2011/0073991 A1 | 3/2011 | Kuriki et al. | |
| 2011/0075322 A1 | 3/2011 | Kuriki et al. | |
| 2011/0075325 A1 | 3/2011 | Ito et al. | |

FOREIGN PATENT DOCUMENTS

| | | |
|---|---|---|
| JP | 11-260669 | 9/1999 |
| JP | 2002-170967 | 6/2002 |
| JP | 2004-221531 | 8/2004 |
| JP | 2010-34300 | 2/2010 |
| JP | 2010-135361 | 6/2010 |

\* cited by examiner

*Primary Examiner* — Thao Le
*Assistant Examiner* — Laura Dykes
(74) *Attorney, Agent, or Firm* — Husch Blackwell LLP

(57) ABSTRACT

The present invention relates to a solar power generation device which includes an electric double-layer capacitor and a solar cell. The electric double-layer capacitor includes a pair of current collectors formed using a light-transmitting conductive material; active materials which are dispersed on the pair of current collectors; a light-transmitting electrolyte layer which is provided between the pair of current collectors; and a terminal portion which is electrically connected to the current collector. The solar cell includes, over a light-transmitting substrate, a first light-transmitting conductive film; a photoelectric conversion layer which is provided in contact with the first light-transmitting conductive film; and a second light-transmitting conductive film which is provided in contact with the photoelectric conversion layer. The electric double-layer capacitor and the solar cell are electrically connected to each other through the terminal portion, the first light-transmitting conductive film, and the second light-transmitting conductive film.

18 Claims, 6 Drawing Sheets

ELECTRIC DOUBLE-LAYER CAPACITOR AND SOLAR POWER GENERATION DEVICE

BACKGROUND OF THE INVENTION

1. Field of the Invention

One embodiment of the disclosed invention relates to an electric double-layer capacitor, a manufacturing method of the electric double-layer capacitor, and a solar power generation device.

2. Description of the Related Art

Solar energy has many advantages compared to an extant energy source. For example, solar energy is virtually infinite and can be used all over the world.

Solar energy is effectively used in a variety of fields. In a building or a car, for example, a portion which is irradiated with sunlight is provided with a solar cell and the solar energy is converted into electricity by the solar cell. The electricity obtained in this manner can be used as part of lighting for a building or a power source for a car.

Solar energy can be obtained in daytime when sunlight can be obtained; however, if electricity obtained as the above is stored, the electricity can also be used at night time or at the time of rain when sunlight cannot be obtained. Accordingly, if solar energy can be used as an energy source, valuable natural resources are not reduced and destroyed (see Patent Document 1).

As power storage systems (also referred to as a power storage device) which store electricity converted by a solar cell, a secondary battery, an electrochemical capacitor, or the like can be given.

As an electrochemical capacitor, a hybrid capacitor such as a lithium ion capacitor (see Patent Document 2), an electric double-layer capacitor (EDLC) (see Patent Documents 3 and 4), and the like have been developed.

[Reference]

[Patent Document 1] Japanese Published Patent Application No. 2002-170967

[Patent Document 2] Japanese Published Patent Application No. 2010-135361

[Patent Document 3] Japanese Published Patent Application No. H11-260669

[Patent Document 4] Japanese Published Patent Application No. 2004-221531

SUMMARY OF THE INVENTION

Since a solar cell generates power by absorbing light and has a structure in which at least visible light is absorbed in a semiconductor layer, the solar cell is opaque. As a solar cell disclosed in Patent Document 1, when a structure in which a semiconductor layer is sandwiched between light-transmitting electrodes is employed, the solar cell can have a light-transmitting property. However, also in this case, most of visible light is absorbed in a semiconductor layer, and the solar cell has a characteristic of transmitting only light in a specific wavelength range (light with a wavelength less than or equal to the band-gap energy of a semiconductor).

However, in a conventional electric double-layer capacitor described in Patent Document 3, a current collector or an active material is formed using a non-light-transmitting material. That is, the conventional electric double-layer capacitor is a non-light-transmitting power storage device.

In a secondary battery, an electrochemical capacitor, or the like, in addition to charge capacity or charge-discharge cycle characteristics, only reduction in thickness or miniaturization has attracted attention, and a light-transmitting property has not been discussed. Therefore, it has been difficult to make the conventional second battery, the conventional electrochemical capacitor, or the like have more functions by combination with a solar cell since the conventional second battery, the conventional electrochemical capacitor, or the like blocks light.

In view of the foregoing, an object of one embodiment of the disclosed invention is to provide a light-transmitting electric double-layer capacitor which has a charging and discharging function.

Another object of one embodiment of the disclosed invention is to reduce an area occupied by a solar cell and a power storage device.

According to one embodiment of the disclosed invention, a light-transmitting power storage device is provided.

According to another embodiment of the disclosed invention, a solar power generation device is provided in which a light-transmitting solar cell and a light-transmitting power storage device are overlapped with each other.

The light-transmitting solar cell and the light-transmitting power storage device are overlapped with each other, whereby an area occupied by the solar cell and the power storage device can be reduced.

One embodiment of the disclosed invention relates to an electric double-layer capacitor including a pair of current collectors formed using a light-transmitting conductive material; active materials which are dispersed on the pair of current collectors; and a light-transmitting electrolyte layer which is provided between the pair of current collectors.

Another embodiment of the disclosed invention relates to a solar power generation device including an electric double-layer capacitor and a solar cell. The electric double-layer capacitor includes a pair of current collectors formed using a light-transmitting conductive material; active materials which are dispersed on the pair of current collectors; a light-transmitting electrolyte layer which is provided between the pair of current collectors; and a terminal portion which is electrically connected to the current collector. The solar cell includes, over a light-transmitting substrate, a first light-transmitting conductive film; a photoelectric conversion layer which is provided in contact with the first conductive film; and a second light-transmitting conductive film which is provided in contact with the photoelectric conversion layer. In the solar power generation device, the electric double-layer capacitor and the solar cell are electrically connected to each other through the terminal portion, the first conductive film, and the second conductive film.

Another embodiment of the disclosed invention relates to a solar power generation device in which the light-transmitting conductive material and a material of the first light-transmitting conductive film and the second light-transmitting conductive film are selected from any one of water-dispersible polyester, indium tin oxide, indium tin oxide containing silicon oxide, organoindium, organotin, zinc oxide, indium zinc oxide containing zinc oxide, zinc oxide doped with gallium, tin oxide, indium oxide containing tungsten oxide, indium zinc oxide containing tungsten oxide, indium oxide containing titanium oxide, and indium tin oxide containing titanium oxide.

In one embodiment of the disclosed invention, the active material is activated carbon or a polyacenic material.

In another embodiment of the disclosed invention, the electrolyte layer includes polyethylene oxide or polypropylene oxide.

In another embodiment of the disclosed invention, the photoelectric conversion layer is formed using any of an amorphous semiconductor layer, a polycrystalline semiconductor layer, and a microcrystalline semiconductor layer.

In another embodiment of the disclosed invention, the photoelectric conversion layer includes a p-type semiconductor layer, an intrinsic semiconductor layer, and an n-type semiconductor layer.

According to one embodiment of the disclosed invention, a light-transmitting electric double-layer capacitor which has a charging and discharging function can be provided.

According to another embodiment of the disclosed invention, an area occupied by a solar cell and a power storage device can be reduced.

DETAILED DESCRIPTION OF THE INVENTION

Figure 1:
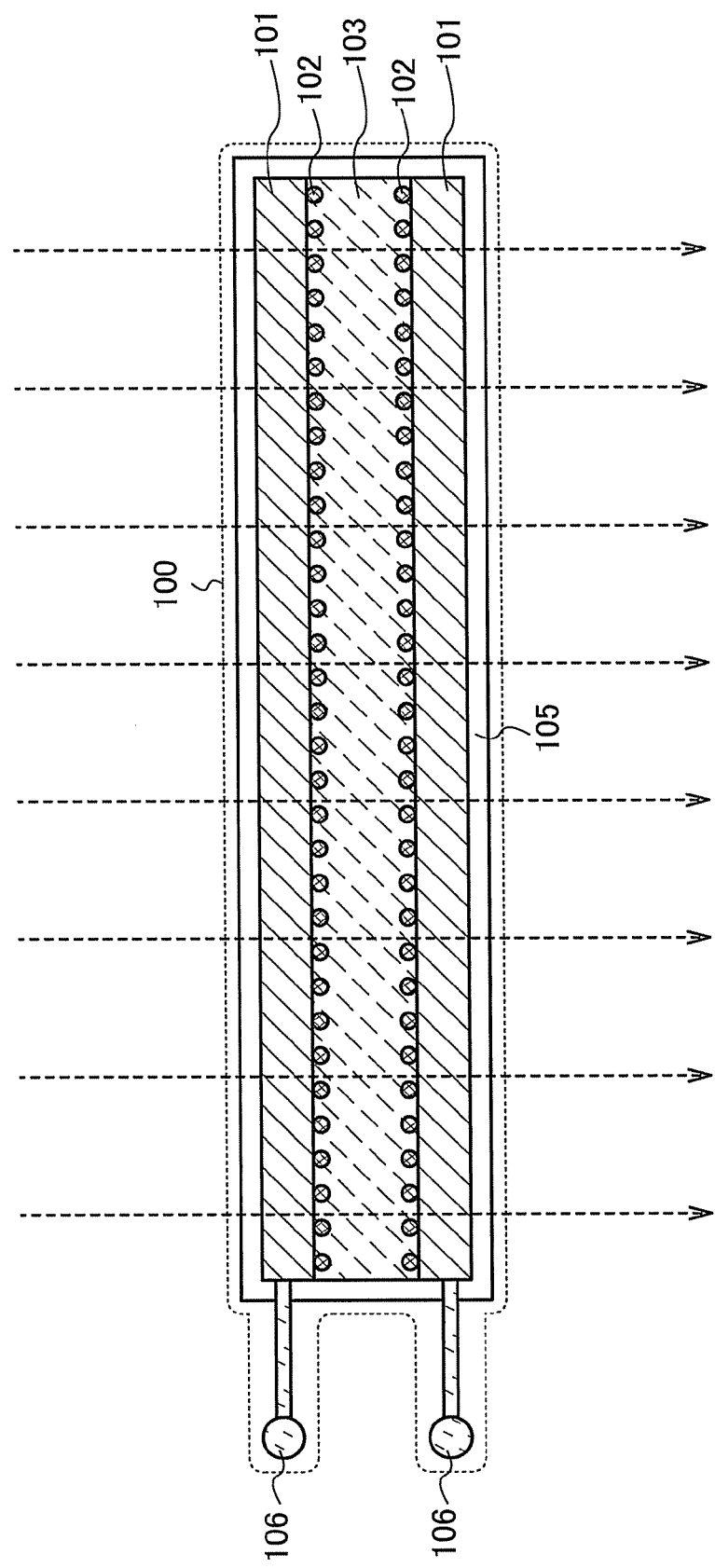
FIG. 1 is a cross-sectional view illustrating a power storage device.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of embodiments. Note that, in the drawings hereinafter shown, the same portions or portions having similar functions are denoted by the same reference numerals, and repeated description thereof will be omitted.

[Embodiment 1]

FIG. 1 illustrates an electric double-layer capacitor in this embodiment. An electric double-layer capacitor 100 illustrated in FIG. 1 includes a pair of current collectors 101; an electrolyte layer 103 which is provided between the pair of current collectors 101; and active materials 102 which are provided so as to be dispersed on the pair of current collectors 101. Note that in this embodiment, the current collector 101 and the active materials 102 are collectively referred to as an electrode.

Each of the pair of current collectors 101 is formed using a light-transmitting conductive material. As a light-transmitting conductive material, for example, water-dispersible polyester, indium tin oxide (ITO), indium tin oxide including silicon oxide (ITSO), organoindium, organotin, zinc oxide (ZnO), indium zinc oxide including zinc oxide (indium zinc oxide (IZO)), zinc oxide doped with gallium (Ga), tin oxide (SnO$_2$), indium oxide including tungsten oxide, indium zinc oxide including tungsten oxide, indium oxide including titanium oxide, or indium tin oxide including titanium oxide is preferably used.

As the active material 102, activated carbon or a polyacenic material which has a large specific surface area is used. For the active material 102 on a negative electrode side, graphite can also be used in addition to the above materials. In the case of using a polyacenic material or graphite as the active material 102 on the negative electrode side, pre-doping with lithium is performed in advance, so that the electric double-layer capacitor 100 can also be used as a lithium ion capacitor. The active materials 102 are provided to be dispersed on surfaces of the pair of current collectors 101 so that the current collectors 101 do not lose a light-transmitting property.

The electrolyte layer 103 is formed using a light-transmitting polymer typified by polyethylene oxide (abbreviation: PEO) or polypropylene oxide (abbreviation: PPO).

A terminal portion 106 is connected to the current collector 101. The terminal portion 106 may be formed using a light-transmitting conductive material similar to that of the current collectors 101. Alternatively, the terminal portion 106 may be formed using a non-light-transmitting conductive material. Further, the terminal portion 106 partly extends outside an exterior material 105.

The current collectors 101, the active materials 102, and the electrolyte layer 103 are provided inside the light-transmitting exterior material 105. As the light-transmitting exterior material 105, a light-transmitting laminate film, a light-transmitting polymer film, a light-transmitting plastic case, or the like can be used.

The electric double-layer capacitor 100 described above includes the light-transmitting current collectors 101; the active materials 102 which are dispersed and provided so that the current collectors 101 does not lose a light-transmitting property; the electrolyte layer 103 which is formed using a light-transmitting polymer; and the light-transmitting exterior material 105. Thus, the light-transmitting electric double-layer capacitor 100 can be obtained.

A manufacturing method of the electric double-layer capacitor 100 in this embodiment will be described below.

Figure 2A:
FIGS. 2A to 2C are cross-sectional views illustrating a manufacturing method of the power storage device.
Figure 2B:
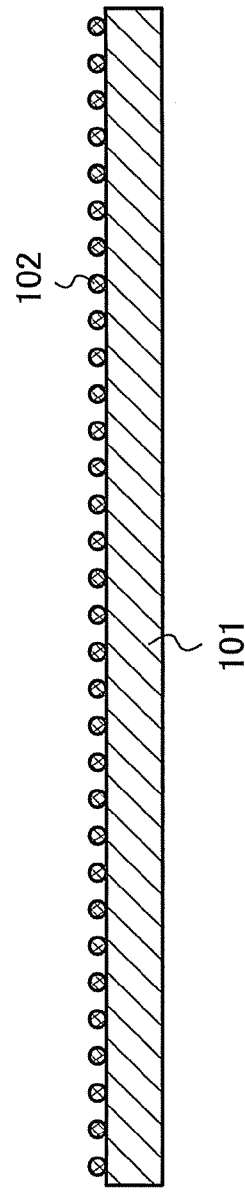

First, the current collector 101 is prepared (see FIG. 2A). Next, the active materials 102 are provided to be dispersed on the current collector 101 so that the current collector 101 does not lose a light-transmitting property (see FIG. 2B).

Figure 2C:
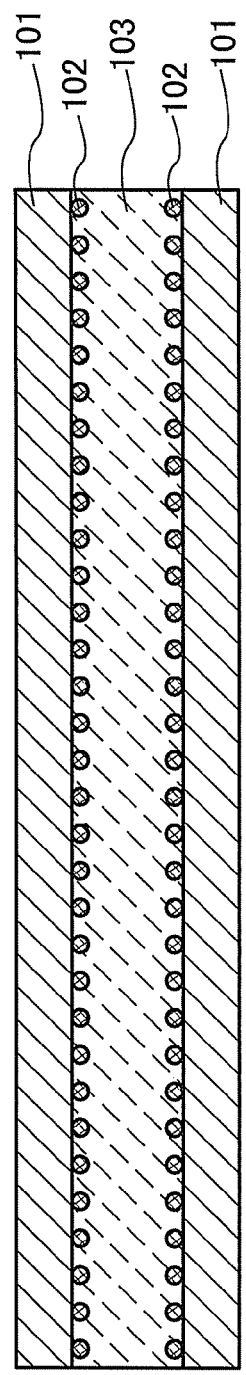

The current collectors 101 are disposed so that surfaces thereof on which the active materials 102 are provided to be dispersed face each other, and the electrolyte layer 103 is provided between the surfaces facing each other (see FIG. 2C).

Next, the terminal portion 106 is electrically connected to the current collector 101. The current collectors 101 to which the terminal portions 106 are connected, the active materials 102, and the electrolyte layer 103 are provided inside the light-transmitting exterior material 105. At this time, the terminal portion 106 is provided so as to partly extend outside the exterior material 105. Thus, the light-transmitting electric double-layer capacitor 100 is formed (see FIG. 1).

Figure 3:
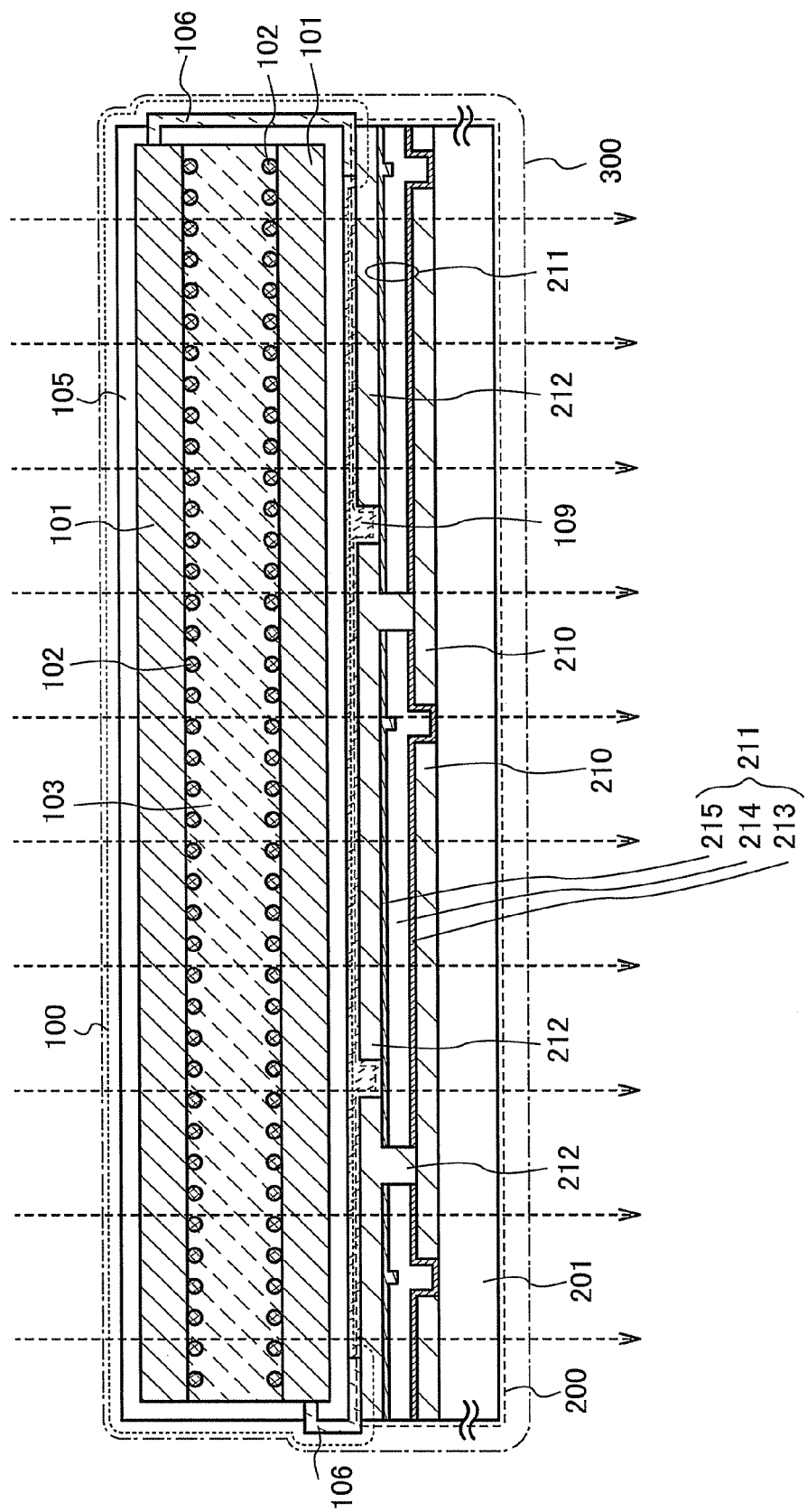
FIG. 3 is a cross-sectional view illustrating a solar power generation device in which a solar cell and a power storage device are overlapped with each other.

FIG. 3 illustrates an example of a solar power generation device in which a light-transmitting solar cell and the light-transmitting electric double-layer capacitor 100 are overlapped with each other.

A solar cell 200 illustrated in FIG. 3 includes, over a light-transmitting substrate 201, a light-transmitting conductive film 210; a photoelectric conversion layer 211 which is provided in contact with the light-transmitting conductive film; and a light-transmitting conductive film 212 which is provided in contact with the photoelectric conversion layer 211.

For example, a glass plate of soda-lime glass, clear flat glass, lead glass, tempered glass, ceramic glass, or the like can be used as the light-transmitting substrate 201. Alternatively, a non-alkali glass substrate of aluminosilicate glass, barium borosilicate glass, aluminoborosilicate glass, or the like; a quartz substrate; or a ceramic substrate can be used.

There is a tendency that a flexible substrate formed using a synthetic resin (e.g., a plastic substrate) generally has a lower allowable temperature limit than the above substrates when the flexible substrate is used as the light-transmitting substrate 201. However, such a substrate can be used as long as it can withstand processing temperature in manufacturing steps.

As a plastic substrate, polyester; polyethersulfone (PES); polyethylene naphthalate (PEN); polycarbonate (PC); a polyamide synthetic fiber; polyetheretherketone (PEEK); polysulfone (PSF); polyetherimide (PEI); polyarylate (PAR); polybutylene terephthalate (PBT); polyimide; an acrylonitrile butadiene styrene resin; polyvinyl chloride; polypropylene; polyvinyl acetate; an acrylic resin; and the like can be given. Polyethylene terephthalate (PET) can be given as polyester, for example.

The light-transmitting conductive film 210 and the light-transmitting conductive film 212 may be formed using any of the light-transmitting conductive materials described above.

The photoelectric conversion layer 211 is a stacked-layer film in which a p-type semiconductor layer, an intrinsic semiconductor layer, and an n-type semiconductor layer are stacked in this order or a stacked-layer film in which an n-type semiconductor layer, an intrinsic semiconductor layer, and a p-type semiconductor layer are stacked in this order. In addition, the p-type semiconductor layer, the intrinsic semiconductor layer, and the n-type semiconductor layer can be foamed using an amorphous semiconductor layer, a polycrystalline semiconductor layer, a microcrystalline semiconductor layer, or the like. In this embodiment, as the photoelectric conversion layer 211, a stacked-layer film in which a p-type semiconductor layer 213, an intrinsic semiconductor layer 214, and an n-type semiconductor layer 215 are stacked in this order is used.

The conductive film 212 and one photoelectric conversion layer 211 are electrically connected to each other on the n-type semiconductor layer 215 side. The conductive film 210 and the one photoelectric conversion layer 211 are electrically connected to each other on the p-type semiconductor layer 213 side. The conductive film 210 is electrically connected to the conductive film 212 formed over the photoelectric conversion layer 211 which is different from the one photoelectric conversion layer 211. Thus, each cell is electrically connected to a different cell. Each cell is connected to a different cell in series, so that output voltage can be increased.

The conductive film 212 of a cell provided at one end portion of the solar cell 200 is electrically connected to one of the terminal portions 106 of the electric double-layer capacitor 100, and the conductive film 212 of a cell provided at another end portion of the solar cell 200 is electrically connected to another of the terminal portions 106 of the electric double-layer capacitor 100. Note that in the case where the terminal portions 106 are formed using a non-light-transmitting material, the terminal portions 106 are provided so as not to inhibit the light-transmitting properties of the solar cell 200 and the electric double-layer capacitor 100.

Since the conductive film 212 is provided on a side where the solar cell 200 and the electric double-layer capacitor 100 face each other in FIG. 3, the conductive film 212 and the terminal portion 106 are electrically connected to each other. However, the conductive film 210 of a cell provided at one end portion of the solar cell 200 may be electrically connected to one of the terminal portions 106 of the electric double-layer capacitor 100, and the conductive film 210 of a cell provided at another end portion of the solar cell 200 may be electrically connected to another of the terminal portions 106 of the electric double-layer capacitor 100.

That is, a positive electrode and a negative electrode of the solar cell 200 are electrically connected to electrodes of the electric double-layer capacitor 100. Thus, electric power generated by the solar cell 200 is stored in the electric double-layer capacitor 100 through the conductive film 210, the conductive film 212, and the terminal portion 106.

A gap surrounded by the exterior material 105 and the terminal portion 106 of the electric double-layer capacitor 100, and the conductive film 212 and the photoelectric conversion layer 211 of the solar cell 200 is filled with a light-transmitting adhesive 109. The electric double-layer capacitor 100 and the solar cell 200 are adhered to each other with the light-transmitting adhesive 109.

Thus, a solar power generation device 300 in which the light-transmitting electric double-layer capacitor 100 and the light-transmitting solar cell 200 are overlapped with each other can be obtained. Since the solar cell 200 and the electric double-layer capacitor 100 have a light-transmitting property, the solar power generation device 300 also has a light-transmitting property. The light-transmitting electric double-layer capacitor 100 and the light-transmitting solar cell 200 are overlapped with each other, whereby an area occupied by the electric double-layer capacitor 100 and the solar cell 200 can be reduced.

Note that FIG. 3 illustrates the solar power generation device 300 in which one electric double-layer capacitor 100 and one solar cell 200 are overlapped with each other; however, the solar power generation device 300 in which a plurality of electric double-layer capacitors 100 and a plurality of solar cells 200 are overlapped with each other may be formed. Consequently, sunlight can be used more efficiently, so that the amount of power generation and the amount of power storage are expected to be increased.

Figure 4A:
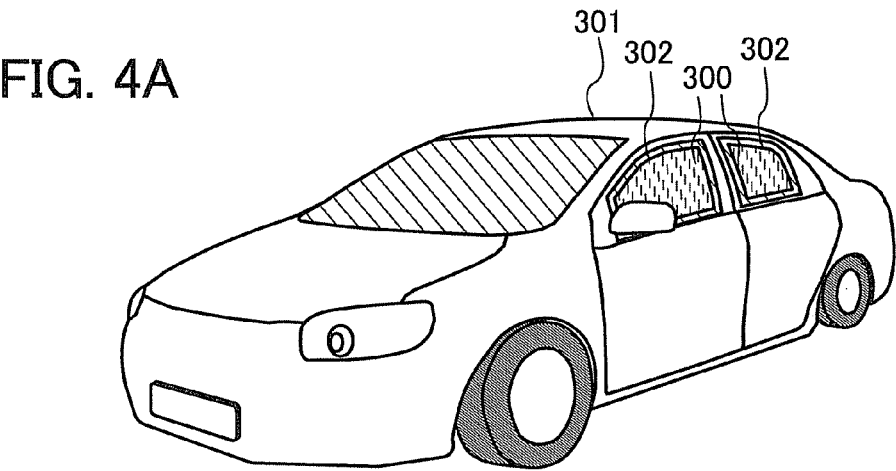
FIGS. 4A to 4C are views each illustrating an example in which a window of an electric vehicle is provided with a solar power generation device.
Figure 4B:
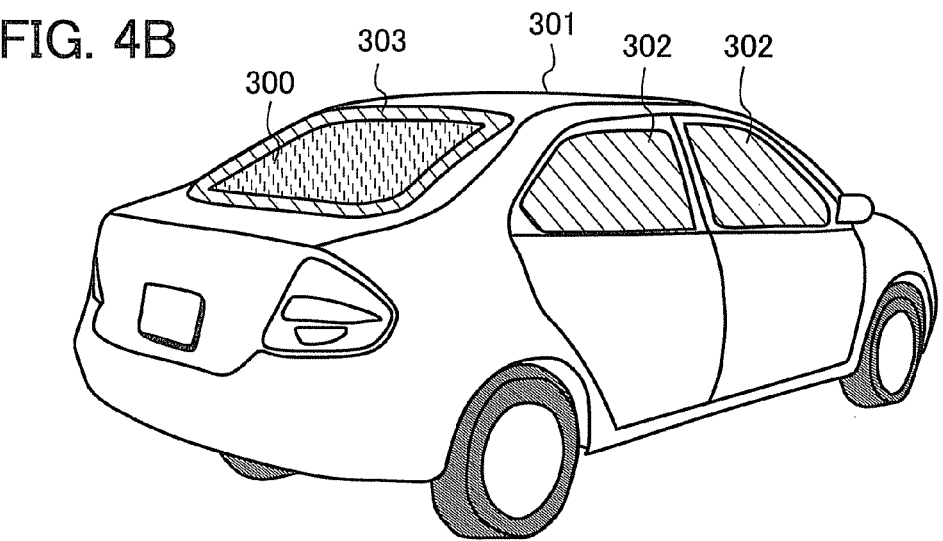
Figure 4C:
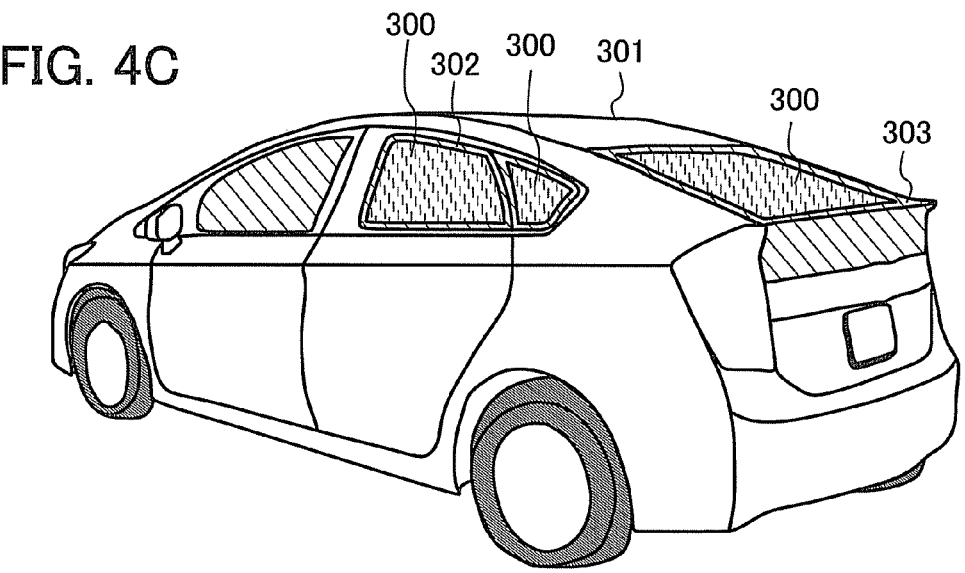

FIGS. 4A to 4C each illustrate an example in which a window of an electric vehicle is provided with the light-transmitting solar power generation device 300.

FIG. 4A is a perspective view of an electric vehicle 301. In FIG. 4A, a side window 302 of the electric vehicle 301 is provided with the light-transmitting solar power generation device 300.

FIG. 4B is another perspective view of the electric vehicle 301. In FIG. 4B, a rear window 303 of the electric vehicle 301 is provided with the light-transmitting solar power generation device 300.

FIG. 4C is the other perspective view of the electric vehicle 301. In FIG. 4C, each of the side window 302 and the rear window 303 of the electric vehicle 301 is provided with the light-transmitting solar power generation device 300.

As illustrated in FIGS. 4A to 4C, the side window 302, the rear window 303, or both the side window 302 and the rear window 303 of the electric vehicle 301 can be provided with the light-transmitting solar power generation device 300.

Electric power generated and stored in the solar power generation device 300 can be used for motive power of the electric vehicle 301, power source of a light of the electric vehicle 301, or the like.

Figure 5:
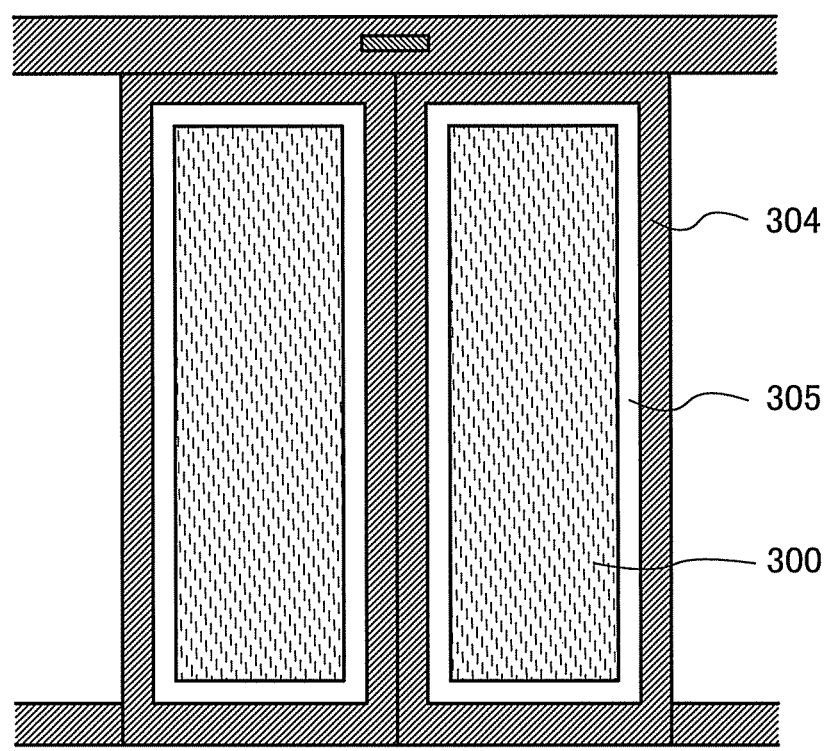
FIG. 5 is a view illustrating an example in which a door of an automatic door is provided with a solar power generation device.

FIG. 5 illustrates an example in which a door of an automatic door is provided with the light-transmitting solar power generation device 300.

FIG. 5 is a front view of an automatic door 304. In FIG. 5, a door 305 of the automatic door 304 is provided with the light-transmitting solar power generation device 300.

Electric power generated and stored in the solar power generation device 300 can be used for motive power of the automatic door 304, or the like.

Figure 6:
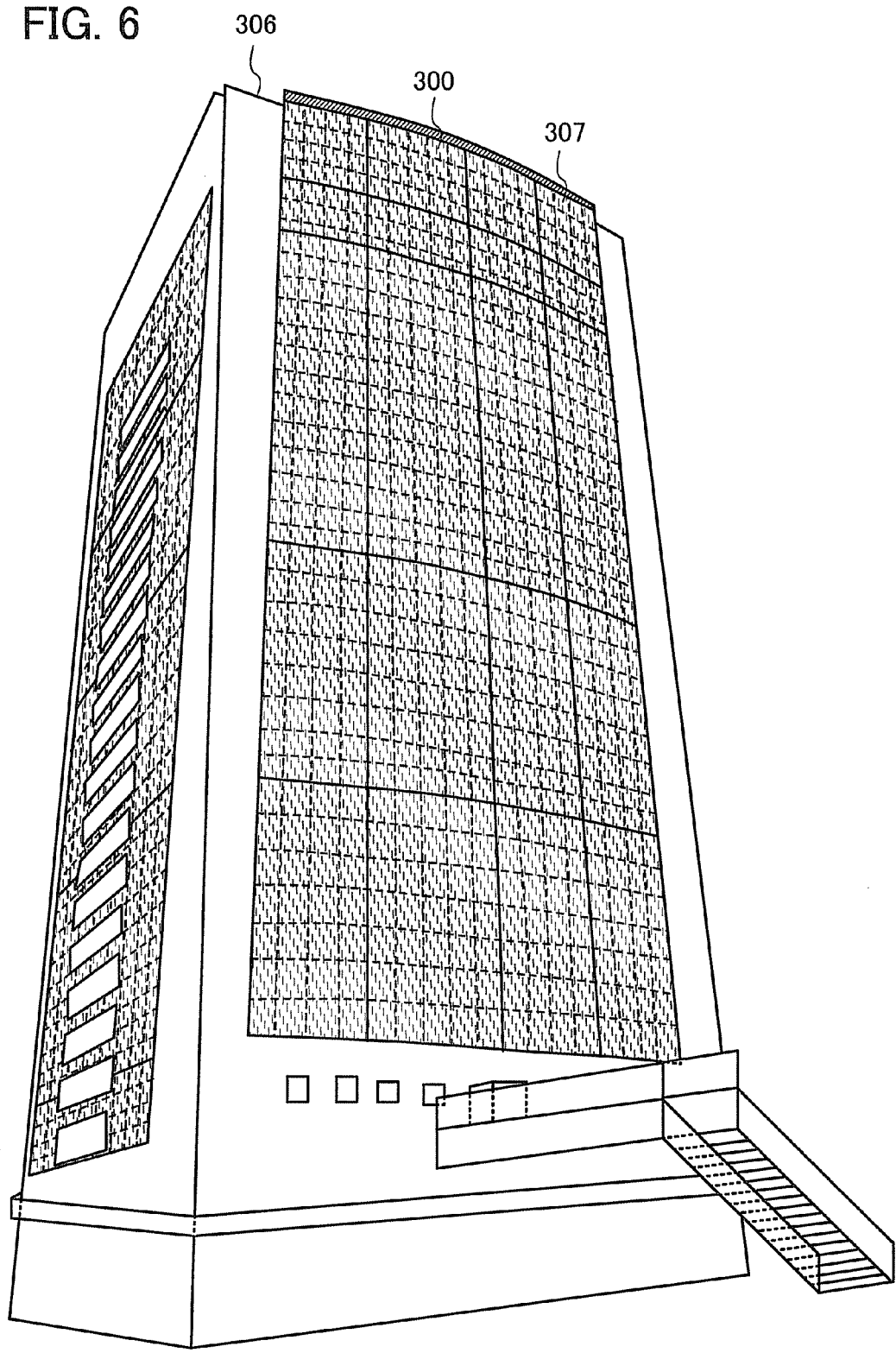
FIG. 6 is a view illustrating an example in which a window of a building is provided with a solar power generation device.

FIG. 6 illustrates an example in which a window of a building is provided with the light-transmitting solar power generation device 300.

FIG. 6 is a perspective view of a building 306. In FIG. 6, a window 307 of the building 306 is provided with the light-transmitting solar power generation device 300.

Electric power generated and stored in the solar power generation device 300 can be used for motive power of a variety of devices which are provided in the building 306, power source of a lighting device which is provided inside or outside the building 306, or the like.

As described above, according to this embodiment, the light-transmitting electric double-layer capacitor 100 can be provided.

Further, according to this embodiment, the solar power generation device 300 in which the light-transmitting solar cell 200 and the light-transmitting electric double-layer capacitor 100 are overlapped with each other can be provided.

The light-transmitting electric double-layer capacitor 100 and the light-transmitting solar cell 200 are overlapped with each other, whereby an area occupied by the electric double-layer capacitor 100 and the solar cell 200 can be reduced.

This application is based on Japanese Patent Application Serial No. 2010-174995 filed with Japan Patent Office on Aug. 4, 2010, the entire contents of which are hereby incorporated by reference.

What is claimed is:

1. An electric double-layer capacitor comprising:
a first current collector including a light-transmitting conductive material;
a second current collector including a light-transmitting conductive material;
first active materials comprising activated carbon or a polyacenic material, which are dispersed on a surface of the first current collector;
second active materials comprising activated carbon or a polyacenic material, which are dispersed on a surface of the second current collector; and
a light-transmitting electrolyte layer between the first current collector and the second current collector so that the first active materials and the second active materials are provided on the light-transmitting electrolyte layer side,
wherein the first active materials and the second active materials are partially provided so that the electric double-layer capacitor does not lose a light-transmitting property, and
wherein the first active materials and the second active materials are embedded within the light-transmitting electrolyte layer.

2. The electric double-layer capacitor according to claim 1, wherein the light-transmitting conductive material is selected from any one of water-dispersible polyester, indium tin oxide, indium tin oxide containing silicon oxide, organoindium, organotin, zinc oxide, indium zinc oxide containing zinc oxide, zinc oxide doped with gallium, tin oxide, indium oxide containing tungsten oxide, indium zinc oxide containing tungsten oxide, indium oxide containing titanium oxide, and indium tin oxide containing titanium oxide.

3. The electric double-layer capacitor according to claim 1, wherein the light-transmitting electrolyte layer includes polyethylene oxide or polypropylene oxide.

4. The electric double-layer capacitor according to claim 1, further comprising a light-transmitting exterior material to surround the first current collector, the second current collector and the light-transmitting electrolyte layer.

5. A solar power generation device comprising:
an electric double-layer capacitor comprising:
a first current collector including a light-transmitting conductive material;
a second current collector including a light-transmitting conductive material;
first active materials comprising activated carbon or a polyacenic material, which are dispersed on a surface of the first current collector;
second active materials comprising activated carbon or a polyacenic material, which are dispersed on a surface of the second current collector;
a light-transmitting electrolyte layer between the first current collector and the second current collector so that the first active materials and the second active materials are provided on the light-transmitting electrolyte layer side; and
a terminal portion which is electrically connected to the first current collector,
wherein the first active materials and the second active materials are partially provided so that the electric double-layer capacitor does not lose a light-transmitting property, and
wherein the first active materials and the second active materials are embedded within the light-transmitting electrolyte layer; and
a solar cell comprising:
a first light-transmitting conductive film over a light-transmitting substrate;
a photoelectric conversion layer in contact with the first light-transmitting conductive film; and
a second light-transmitting conductive film in contact with the photoelectric conversion layer,
wherein the electric double-layer capacitor and the solar cell are electrically connected to each other through the terminal portion, the first light-transmitting conductive film, and the second light-transmitting conductive film.

6. The solar power generation device according to claim 5, wherein the light-transmitting conductive material and a material of the first light-transmitting conductive film and the second light-transmitting conductive film are selected from any one of water-dispersible polyester, indium tin oxide, indium tin oxide containing silicon oxide, organoindium, organotin, zinc oxide, indium zinc oxide containing zinc oxide, zinc oxide doped with gallium, tin oxide, indium oxide containing tungsten oxide, indium zinc oxide containing tungsten oxide, indium oxide containing titanium oxide, and indium tin oxide containing titanium oxide.

7. The solar power generation device according to claim 5, wherein the light-transmitting electrolyte layer includes polyethylene oxide or polypropylene oxide.

8. The solar power generation device according to claim 5, wherein the photoelectric conversion layer is any of an amorphous semiconductor layer, a polycrystalline semiconductor layer, and a microcrystalline semiconductor layer.

9. The solar power generation device according to claim 5, wherein the photoelectric conversion layer includes a p-type semiconductor layer, an intrinsic semiconductor layer, and an n-type semiconductor layer.

10. The solar power generation device according to claim 5, wherein the electric double-layer capacitor and the solar cell are adhered to each other with a light-transmitting adhesive.

11. The solar power generation device according to claim 5, further comprising a light-transmitting exterior material to surround the first current collector, the second current collector and the light-transmitting electrolyte layer.

12. A solar power generation device comprising:
an electric double-layer capacitor comprising:
a first current collector including a light-transmitting conductive material;
a second current collector including a light-transmitting conductive material;
first active materials comprising activated carbon or a polyacenic material, which are dispersed on a surface of the first current collector;
second active materials comprising activated carbon or a polyacenic material, which are dispersed on a surface of the second current collector;
a light-transmitting electrolyte layer between the first current collector and the second current collector so that the first active materials and the second active materials are provided on the light-transmitting electrolyte layer side; and
a terminal portion which is electrically connected to the first current collector,
wherein the first active materials and the second active materials are partially provided so that the electric double-layer capacitor does not lose a light-transmitting property, and
wherein the first active materials and the second active materials are embedded within the light-transmitting electrolyte layer; and
a solar cell comprising:
a first light-transmitting conductive film over a light-transmitting substrate;
a photoelectric conversion layer in contact with the first light-transmitting conductive film; and
a second light-transmitting conductive film in contact with the photoelectric conversion layer,
wherein the electric double-layer capacitor and the solar cell are overlapped with each other, and
wherein the first current collector and the second light-transmitting conductive film are electrically connected to each other through the terminal portion.

13. The solar power generation device according to claim 12, wherein the light-transmitting conductive material and a material of the first light-transmitting conductive film and the second light-transmitting conductive film are selected from any one of water-dispersible polyester, indium tin oxide, indium tin oxide containing silicon oxide, organoindium, organotin, zinc oxide, indium zinc oxide containing zinc oxide, zinc oxide doped with gallium, tin oxide, indium oxide containing tungsten oxide, indium zinc oxide containing tungsten oxide, indium oxide containing titanium oxide, and indium tin oxide containing titanium oxide.

14. The solar power generation device according to claim 12, wherein the light-transmitting electrolyte layer includes polyethylene oxide or polypropylene oxide.

15. The solar power generation device according to claim 12, wherein the photoelectric conversion layer is any of an amorphous semiconductor layer, a polycrystalline semiconductor layer, and a microcrystalline semiconductor layer.

16. The solar power generation device according to claim 12, wherein the photoelectric conversion layer includes a p-type semiconductor layer, an intrinsic semiconductor layer, and an n-type semiconductor layer.

17. The solar power generation device according to claim 12, wherein the electric double-layer capacitor and the solar cell are adhered to each other with a light-transmitting adhesive.

18. The solar power generation device according to claim 12, further comprising a light-transmitting exterior material to surround the first current collector, the second current collector and the light-transmitting electrolyte layer.

* * * * *